US005278753A

United States Patent [19]

Graft, III

[11] Patent Number: 5,278,753

[45] Date of Patent: Jan. 11, 1994

[54] ELECTRONIC VOTING SYSTEM

[76] Inventor: Charles V. Graft, III, 220 W. Roberts Rd., Indianapolis, Ind. 46217-3460

[21] Appl. No.: 745,891

[22] Filed: Aug. 16, 1991

[51] Int. Cl.[5] .............. G06F 15/74

[52] U.S. Cl. .............. 364/409

[58] Field of Search .............. 364/409; 235/54 F; 235/50 B; 235/385

[56] References Cited

U.S. PATENT DOCUMENTS

| | | | |
|---|---|---|---|
| 4,010,353 | 3/1977 | Moldovan, Jr. et al. | 235/54 |
| 4,015,106 | 3/1977 | De Philipo | 235/54 |
| 4,021,780 | 5/1977 | Narey et al. | 340/172.5 |
| 4,227,643 | 10/1980 | Luther | 235/54 |
| 4,578,572 | 3/1986 | Hice | 235/472 |
| 4,641,240 | 2/1987 | Boram | 364/409 |
| 4,641,241 | 2/1987 | Boram | 364/409 |
| 4,649,264 | 3/1987 | Carson | 235/54 |
| 4,658,357 | 4/1987 | Carroll et al. | 364/406 |
| 4,813,708 | 3/1989 | Narey | 283/5 |
| 4,866,756 | 9/1989 | Crane et al. | 379/88 |
| 4,972,319 | 11/1990 | Delorme | 364/419 |

*Primary Examiner*—Donald E. McElheny, Jr.
*Attorney, Agent, or Firm*—Woodard, Emhardt, Naughton, Moriarty & McNett

[57] ABSTRACT

An electronic voting system includes an optical-disk cartridge adapted to store election data and ballots therein, a plurality of precinct computing units corresponding to geographical precincts in an election, and a headquarter computing unit remote from the precinct computing unit and corresponding to a geographical county in an election. The precinct and headquarter computing units include optical disk drives for receiving and accessing the optical-disk cartridge. The precinct computing unit is connected to a display for transmitting the election data to the voters and for receiving the ballots cast by the voters. The optical-disk cartridge is transportable between the precinct computing unit and the headquarter computing unit to communicate the election data and ballots therebetween.

16 Claims, 15 Drawing Sheets

ELECTRONIC VOTING SYSTEM

BACKGROUND OF THE INVENTION

This invention relates in general to electronic voting systems and more specifically to an electronic voting system including an electronic optical medium for storing data thereon.

Until recently, elections for public office have been typically carried out using a plurality of mechanical voting machines which incremented mechanical counters corresponding to the candidates for office as voters cast their ballots. As a result, running totals were maintained at each machine corresponding to each candidate, and at the end of the election the counters from the various machines were manually read and tabulated to determine an election outcome. With recent advances in electronics, electronic voting machines have been proposed which do away with the cumbersome tabulations common with the mechanical voting machines.

Prior devices which have been developed in an attempt to automate voting by incorporating advances in electronics include De Phillipo, U.S. Pat. No. 4,015,106, Narey et al., U.S. Pat. No. 4,021,780, and Moldovan, Jr. et al., U.S. Pat. No. 4,010,353. De Phillipo discloses a microprocessor based electronic voting machine with a scratch pad memory for storing data and contemplates a permanent memory of the conventional magnetic variety for storing the contents of the scratch pad memory. De Phillipo also appears to contemplate optical links in place of telephone lines for connecting a plurality of districts to a central polling station. Narey et al. describes a ballot tallying system employing a series of memories, including a digital ballot image memory and a digital totals memory. An opto-electronic sensor is employed for sensing ballot cards. Moldovan, Jr. et al., U.S. Pat. No. 4,010,353, discloses a microcomputer based electronic voting machine employing magnetic tapes for permanently recording ballots cast by voters.

Other electronic voting devices which have incorporated various security features to prevent voting fraud include Boram, U.S. Pat. Nos. 4,641,240 and 4,641,241, Carson, U. S. Pat. No. 4,649,264, and Luther, U.S. Pat. No. 4,227,643. Boram '240 and '241 disclose a memory cartridge for an electronic voting system which includes electrically erasable read only memory (EEROM) and non-electrically erasable read only memory (EPROM). To prevent alteration of data contained in the EPROM, the EPROM contains a fuse which is blown at the end of the election. Carson describes a portable self-contained electronic voting machine which permanently stores data on an EPROM cartridge by "burning" the data onto the EPROM. Luther discloses an electronic voting machine which stores data in a computer memory and utilizes a locking mechanism to prevent voting fraud.

Hice and Narey, U.S. Pat. Nos. 4,578,572 and 4,813,708 respectively, describe generally reading devices. Hice discloses a microprocessor-based code printing and reading system used for voter registration. Narey discloses a ballot for use with a scanning device.

Nevertheless, problems common to both mechanical and electronic voting machines still remain, including perhaps the most pervasive problem of preventing unauthorized access and tampering with votes recorded by the voting machines. Further, magnetically recorded data have relatively short shelf lives, often requiring copying to new tapes every three years. Magnetic media are also susceptible to electromagnetic radiation and are inherently fragile. For example, if the surface of a floppy disk is marred or its magnetic coating worn away, data can be irretrievably lost. Also, stretching and abrasion of magnetic tape surfaces can likewise result in lost data. Similarly, EPROM recorded data can be erased by exposing the EPROM to ultraviolet light, therefore requiring sealing of the EPROM in a light-opaque case to assure the contents of the EPROM can only be written to once. Magnetic media and the like are often relatively low density, therefore increasing the physical size and resulting in long access times when storing large amounts of data.

A need therefore exists for an improved voting system which can store large amounts of data on a comparatively small media. Also desired is an improved voting system which can store data in a secure manner, wherein the data storage media is unerasable once written thereto. The data storage media should have a long shelf life and be highly resistant to damage. Additionally, the data storage media should be immune to electromagnetic interference.

SUMMARY OF THE INVENTION

An electronic voting system is disclosed, according to one embodiment of the present invention, for use by voters to cast ballots therein during an election. The voting system includes an electronic optical medium adapted to store election data and ballots thereon. A precinct computing unit, corresponding to a geographical precinct in an election, has optical read/write means for receiving and accessing the optical medium. Output means are connected to the precinct computing unit for transmitting the election data to the voters, and input means are connected to the precinct computing unit for receiving the ballots cast by the voters. A headquarter computing unit, remote from the precinct computing unit and corresponding to a geographical county in an election, has optical read/write means for receiving and accessing the optical medium. The optical medium is transportable between the precinct computing unit and the headquarter computing unit to communicate the election data and ballots therebetween.

One object of the present invention is to provide an improved electronic voting system.

Another object of the present invention is to provide a voting system employing a single optical medium for storing large amounts of data thereon.

Another object of the present invention is to provide an indelible optical medium for use with an electronic voting system, wherein data stored on the optical medium cannot be erased nor overwritten.

Another object of the present invention is to provide an optical medium for use with an electronic voting system, wherein the optical medium has a long shelf life, is immune to electromagnetic radiation, and is highly resistant to damage.

Related objects and advantages of the present invention will become apparent from the following description.

DESCRIPTION OF THE PREFERRED EMBODIMENT

Figure 1:
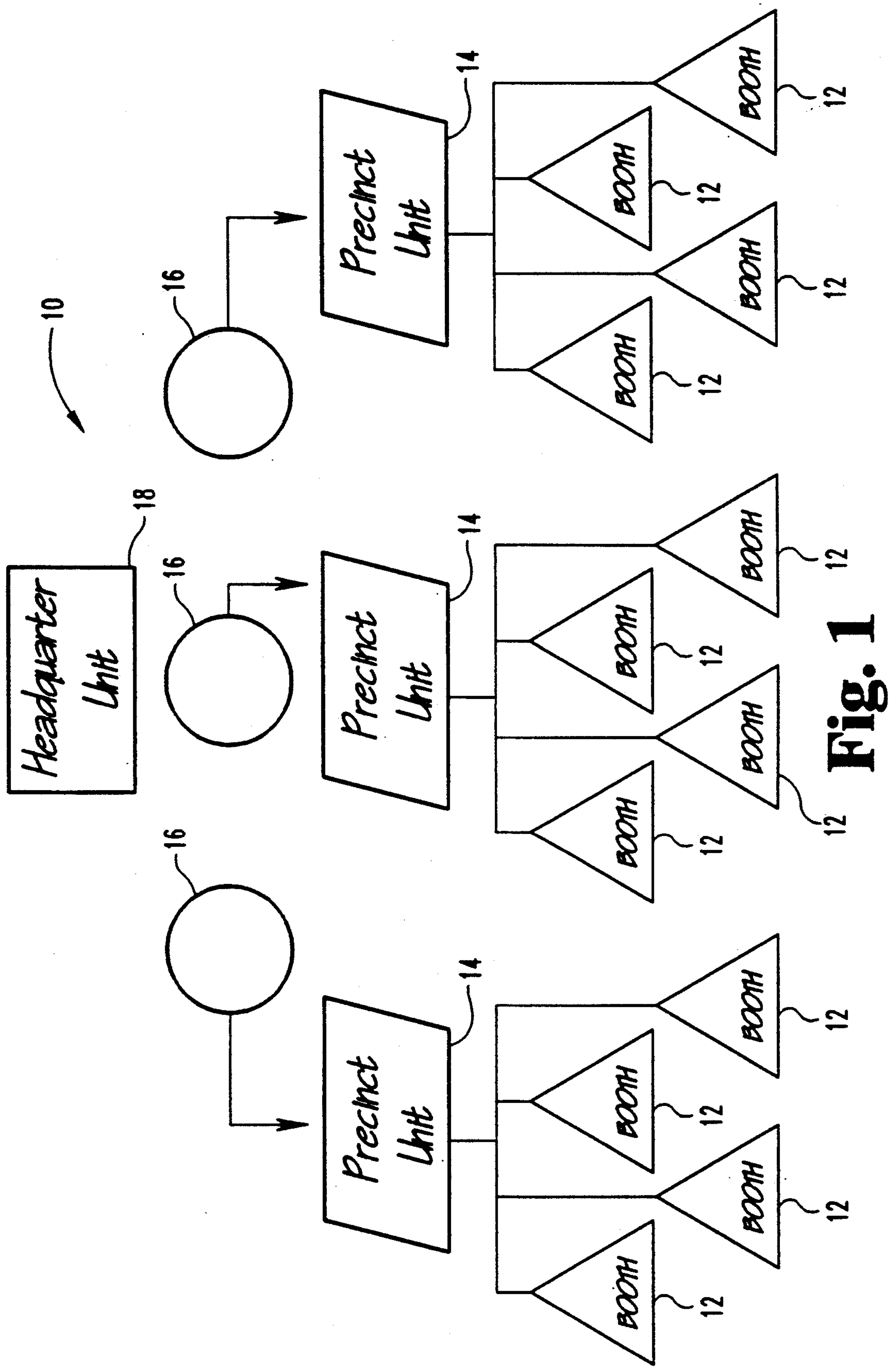
FIG. 1 is a diagrammatic illustration of an electronic voting system according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a schematic drawing of one embodiment of an electronic voting system according to one embodiment of the present invention is shown. Voting system 10 includes individual voting booths 12 electronically connected to precinct computing units 14. High security optical media 16 are transportable for receipt between a headquarter computing unit 18 and the precinct computing units 14. Optical media 16 transfer election software and data recorded thereon to the precinct computing units prior to an election. Votes received at the precinct computing units are individually recorded on the optical media during an election, wherein the optical media transfer the recorded votes to the headquarter unit for tabulation when the election is completed.

In the preferred embodiment, the optical media take the form of optical-disk cartridges, with each cartridge capable of permanently storing election data, software and votes cast to independently support an entire precinct. Because optical-disk drives write to the optical-disk cartridges by permanently and physically altering the optical-disk, data is permanently recorded and cannot thereafter be overwritten. As a result, optical-disk drives are alternately described as WORM (Write Once Read Many) drives, wherein the associated optical media 16 are described as WORM cartridges.

Because WORM cartridges are unerasable and typically warranted to have a shelf life of at least ten years, WORM cartridges are considered to be permanent records consistent with microfiche and microfilm and other such permanent records. WORM cartridges also are highly resistant to electromagnetic radiation and are extremely durable, wherein the optical disks are highly resistant to damage resulting from mishandling. Furthermore, WORM cartridges can be written to piecemeal rather than mastered (recorded in their entirety), thereby facilitating permanent storage of votes as they are received in an election.

Other optical media capable of permanently storing large amounts of data are also contemplated, including storing data on digital optical tape (DOT), commonly referred to as digital-paper storage. Still other optical media capable of storing large amounts of data are contemplated, such as multi-function drives using magneto-optical technology, wherein the multi-function drive functions as a WORM drive. The multi-function drive can also function as a rewritable optical drive for accessing non-critical portions of the optical disk. Whichever optical drive is employed, tile drive should optimally be capable of permanently writing large amounts of data consistent with an election on a single transportable disk or cartridge, wherein the disk or cartridge is not rewritable.

Each precinct computing unit 14 corresponds to a geographical precinct during an election. Similarly, each headquarter computing unit 18 corresponds to a geographical county in an election. In the preferred embodiment, each geographical county employs a single headquarter computing unit 18 and a number of precinct computing units 14 corresponding to the number of geographical precincts within that county.

A secured computing unit (not shown) remote from the election process and operated by a private entity independent of the election process performs the initial formatting of the optical disk. As such, the secured computing unit has access to write to the entire optical-disk, thereby formatting the disk with programming software for the precinct computing units and disk identification data specific to the voting system 10.

The headquarter computing unit 18 completes the formatting of the optical disks by downloading election data specific to the precinct with which the WORM disk or cartridge is to be used. For example, the headquarter computing unit can download election data such as lists of voter names for a particular precinct, names of electoral offices and a listing of candidates running for office and their respective parties. After an election and the WORM disks are returned to county headquarters, the headquarter computing unit 18 reads each disk, tabulates and confirms the votes cast to determine an election outcome, and prints out the results.

In FIG. 1, each precinct computing unit is schematically shown in relation to a single headquarter computing unit and having four voting booths connected thereto. Although FIG. 1 depicts only three precinct computing units, the preferred embodiment contemplates one headquarter computing unit capable of handling approximately 200 precinct computing units. Other numbers and combinations of computing units are contemplated as well. For example, depending on the size of the county and the capacity of the headquarter computing units, multiple headquarter computing units could be employed interfacing with each other. Similarly, in smaller geographical regions, the headquarter computing unit can be combined with the precinct computing unit, wherein the multiple headquarter/precinct computing units service the geographical county and interface with each other.

Responsibility for security, in addition to the optical WORM technology, is shared between the private entity, county officials, and precinct officials. Security for the voting system in addition to the WORM secured disks and drives is contemplated as including non-industry standard disk formatting, including non-industry standard disk identification, software and hardware. Additionally each precinct computing unit can further incorporate all electronic signature that identifies the precinct computing unit with the data records stored on the WORM disk. Similarly, the WORM disks can be individually encoded to operate only with a specific serialized precinct computing unit. Physical security measures are contemplated as well, wherein the optical discs, computing units and equipment are protected from public access, and signatures such as holographic encoding are affixed to the optical disks to prevent unauthorized access thereto.

The headquarter computing unit 18 is also contemplated as including registration programming, thereby eliminating primary registration computers typically employed at the county level. As another alternative, the headquarter computing unit can be provided with a data interface, such as an RS232 interface, for connecting to the primary registration computer to download ballots and other voter information onto the WORM disks.

The headquarter computing unit 18 includes one or more optical WORM disk drives capable of read/write operation and is preprogrammed to tabulate ballots received on the WORM cartridges from the precinct computing units and to determine voter turnout. For primary elections, programming includes tabulating the party affiliation of each voter as well. Optionally, the headquarter unit can include signature scanning and recording programming for receiving signatures electronically scanned at the precinct level and digitally recorded on the WORM disk. While uneconomical at present, future versions may include equipment for verifying the authenticity of each signature. In a county without a registration computer, the headquarter computing unit can include additional disk drives for reading names of voters from voter lists created in prior elections.

The precinct computing unit includes an optical WORM disk drive capable of both read/write operation and is preprogrammed to automatically load software stored on the WORM cartridge upon power-up. Also included is an internal clock powered by a long-life battery or other similar power source, wherein the internal clock cannot be externally accessed. In the preferred embodiment, the precinct computing unit is programmed to automatically enable votes to be recorded only at a given date and time and according to the internal clock. Also contemplated is manual enablement of the precinct computing unit by the precinct officials, wherein the internal clock is employed to reset the voting booths and to mark votes cast after a preprogrammed poll closing time. In the preferred embodiment, the WORM optical disk drive is a 5¼" optical disk drive Model WM-D050 available through Toshiba America, Inc., Disk Products Division, 9740 Irvine Boulevard, Irvine, Calif., 92718.

Figure 2:
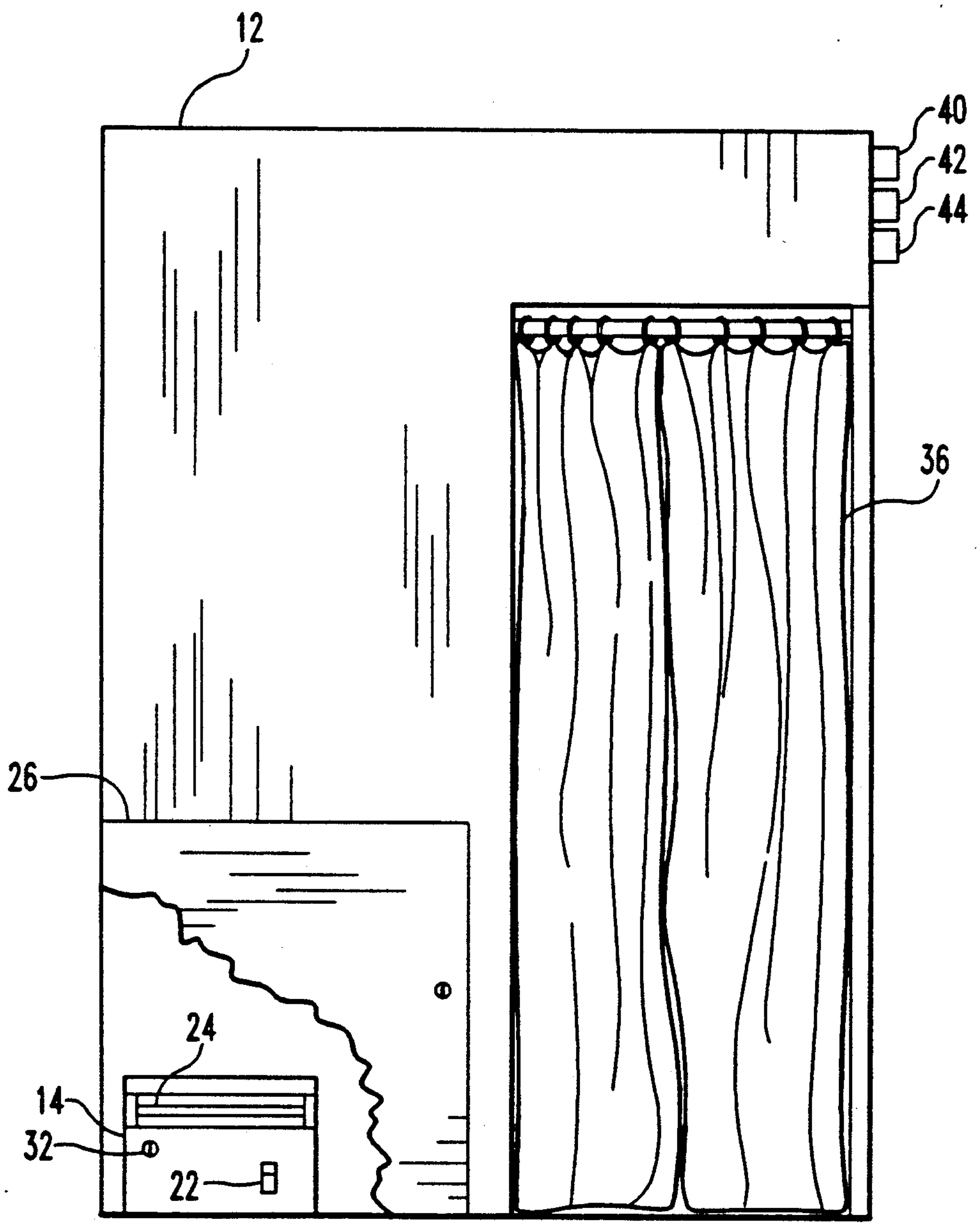
FIG. 2 is a front plan view of a voting booth of the system of FIG. 1 containing a precinct computing unit.
Figure 3:
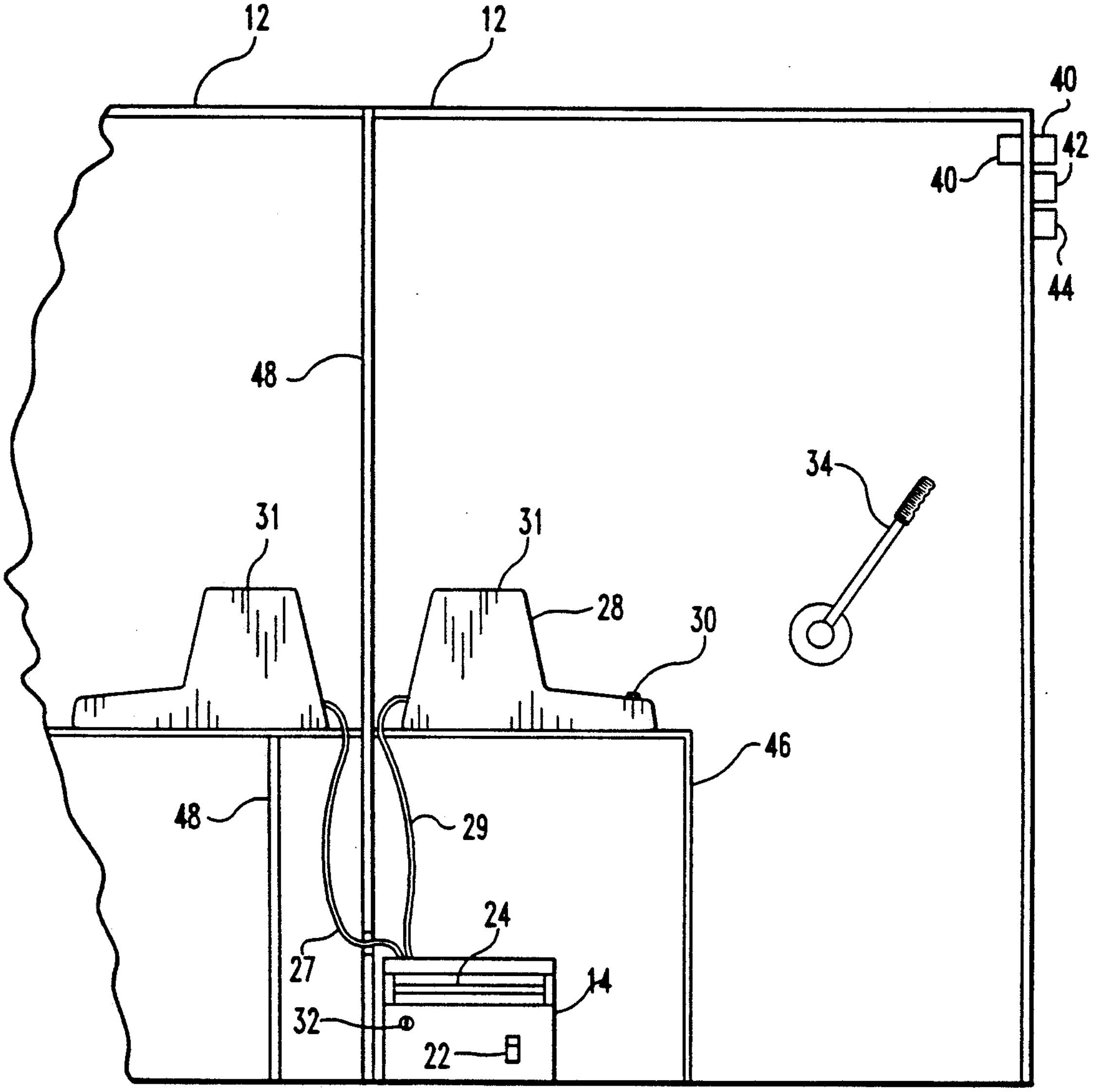
FIG. 3 is front cross-sectional view of the voting booth in FIG. 2 adjacent to another voting booth, wherein display units are electronically connected to a common precinct computing unit.
Figure 4:
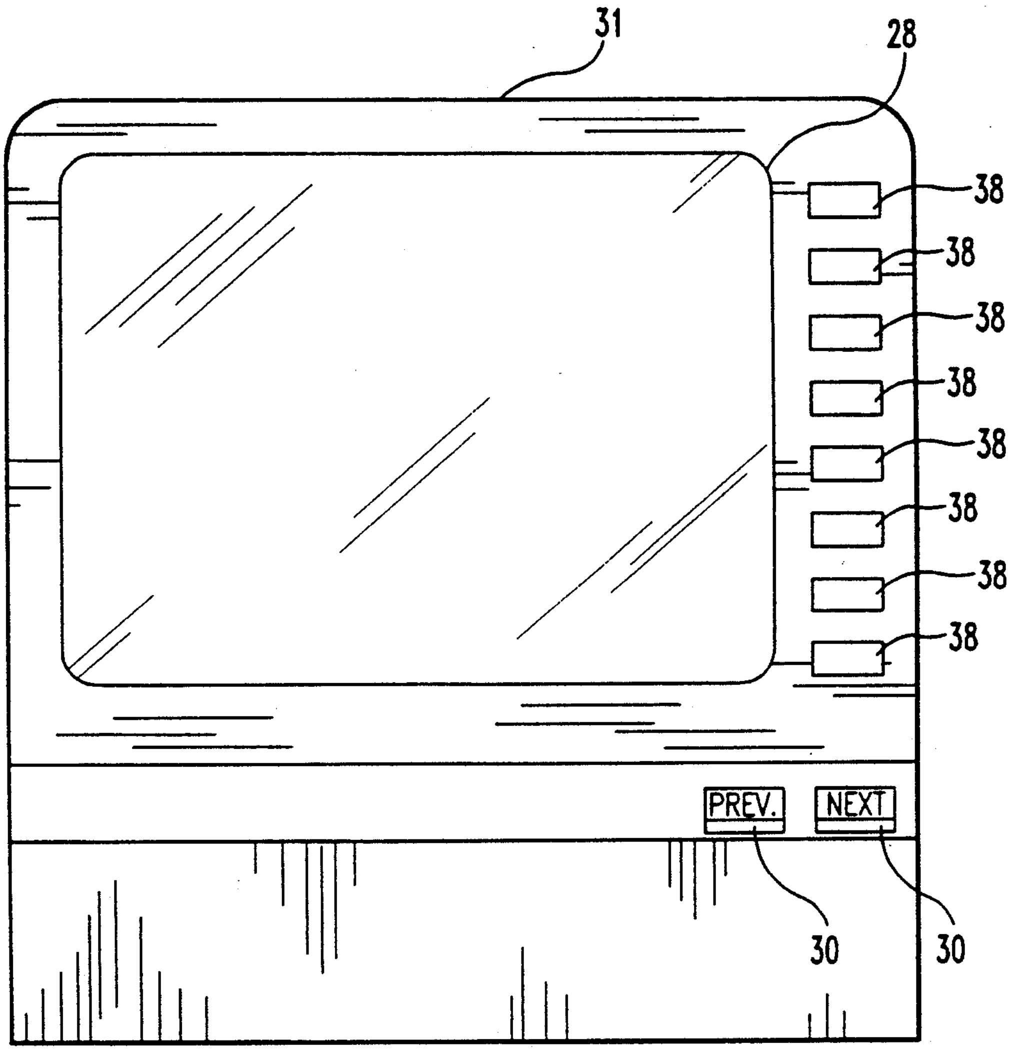
FIG. 4 is a front plan view of the display unit in FIG. 3.

Referring now to FIGS. 2 through 4, a precinct unit 14 is shown contained in a voting booth 12. The precinct computing unit 14 is similar in size to current personal computing units and includes multi-pin data interface connectors 27 for receiving multiple voting booths. Also included are multi-pin connectors 29 for receiving display units 31 located in each voting booth. In the preferred embodiment, display 28 is combined with function keys 30 into display unit 31 as security against tampering. Also provided is a secure keyboard (not shown) connected to the precinct computing unit for receiving command signals from precinct officials, such as for closing the voting polls at the end of an election. The precinct computing unit 14 includes a lock 32 and is individually lockable by a key specific to the associated precinct and available only via the precinct officials. As such, the precinct computing unit is further protected against unauthorized access.

Operationally, the precinct computing unit includes only a power on/off switch 22. The WORM disk 16 is received in the optical disk drive slot 24. Upon power-up, the optical disk drive door locks the WORM disk in place. The precinct computing unit tests to ensure a locked door before loading software and data from the WORM disk to virtual or RAM memory contained within the precinct computing unit. Optionally, large amounts of data can be accessed from the WORM disk as required during subsequent voting without being downloaded to the precinct computing unit. The software programming downloaded from the WORM disk operates to structure the memory of the precinct computing unit and to compare the date and time registered on the internal clock to a preprogrammed date and time, wherein program execution advances to activate the voting booths and initialize a voting program when the predetermined date and time occur.

The precinct computing unit can also include or receive programming for reading and tabulating votes recorded on the WORM disk for display at the precinct level, thereby providing election results for forecasting election outcomes prior to closing of the polls. Modem connections and/or other data links can be similarly provided so that the headquarter computing unit can poll the various precinct computing units during an election to forecast an election outcome. When voting is ended, the precinct officials input a command signal to finalize voting, wherein the WORM disk is permanently write-protected to prevent further storage of data thereon. Each precinct WORM disk is then returned to county headquarters to be verified, and to have votes read and tabulated by the headquarter computing unit to determine a final election outcome.

The voting booths 12 and precinct computing unit 14 are set in place at the precinct in advance of the election. For additional security, the precinct computing unit is secured inside one of the voting booths in a secure cabinet 46 behind locked door 26, with the remaining booths physically adjacent thereto to prevent unauthorized access to the multi-pin data interfaces connecting the display units 31 to the precinct computing unit 14. Before the election, a diagnostic disk is run to confirm the operation of the voting booths and the precinct computing unit. Optionally, a maintenance computing unit can also be provided to test and verify the precinct computing unit functions. The maintenance unit can also reset the internal clock with the correct date and time if required.

In the preferred embodiment, voter identification is manually performed prior to a voter entering the voting booth to cast his or her votes, wherein the precinct officials confirm the voter's identification. Optionally, voter identification can be fully computerized, wherein the precinct computing unit includes programming for confirming voter identification, including verifying the voter's signature. A scanner can read the voter's signature and digitally encode the signature for comparison to known voter signatures stored on the WORM disk. The precinct computing unit then can confirm the voter's signature before enabling the voting booth.

After the voter's identity is confirmed, the voter enters the voting booth. The voting booth can be manually reset by the precinct official to start voting or, in the preferred embodiment, the booth is automatically reset when the voter pulls voting lever 34 to close the curtains 36 to the voting booth. Each voting booth contains the combination display unit 31 for conveying election data stored on the WORM disk to the voter and for receiving votes cast therein. Display 28 can be either a CRT or LCD type, with corresponding electronic switches 38 located adjacent thereto for voter interaction and function keys 30 for performing common tasks, such as advancing to the next screen (See FIG. 4). To start the voting, the voter receives instructions via the display screen for casting his or her ballot. Votes cast are recorded in the precinct computer RAM memory when the voter actuates the voting switches 38 adjacent to the display screen and corresponding to the various candidates.

The cast votes are not recorded on the WORM disk until the voter specifically enters them at the close of his selections. Upon the voter's completion of entering his or her votes, the votes temporarily stored in the precinct computing unit's RAM memory are permanently written onto the WORM disk. The votes are automatically entered when the voter leaves the booth, such as by pulling voting lever 34 which opens curtains 36 to the voting booth 12. Optionally, the votes can be entered when the precinct official resets the booth for the next voter. The precinct computing unit includes random means for writing the votes onto the WORM optical disk, wherein the voter's identity is disassociated from his or her vote and a separate disk field is written to for indicating that the voter has voted. For example, the precinct computing unit can include random number generating means to determine which field of the WORM disk the vote is written to; i.e., if the random number is 5, the precinct computing unit writes to the fifth next available field on the WORM disk.

When the voter is finished voting, the booth is deactivated. The booth automatically resets after a predetermined time interval. Optionally, the precinct official can reset the booth via an external switch.

During operation, the precinct computing unit polls voting switches 38 in the voting booths several times a second. If a signal from a voting switch is received, the associated voting booth display is updated to include an "X" or other such marking affirming the candidate chosen. The precinct computing unit program can automatically step to display the next candidates for office. In the preferred embodiment, the precinct computing unit requires prompting by the voter for reviewing prior selections or to advance to the next office and candidates therefor.

The voting booths common in the art provide the necessary secure environment in which a voter can secretly cast his or her vote. A "VOTING IN PROGRESS" light 40 is provided both interior and exterior to the voting booth. Similarly, a "BOOTH READY" light 42 and "HELP" light 44 are displayed exterior Lo the booth. The voting booth containing the precinct computing unit incorporates a locking cabinet 46 in which to securely house the precinct computing unit an other equipment such as a power supply and a backup battery. The adjacent booths incorporate secure panels 48 protecting the data interface connectors from unauthorized access.

Each WORM disk is partitioned into four regions varying in accessibility by the various computing units. The first disk region contains identification coding provided by the private entity during initial formatting of the disk, and as such, is read/write accessible only by the private entity. The second disk region contains the election software programming to be downloaded to the precinct computing unit. This second region is, therefore, read only accessible by the precinct computing units. For further security, the second region is inaccessible to the headquarter computing units, thereby preventing ally unauthorized alterations of the election programming at the county level.

The third disk region contains the ballot, opening and closing times for the polls and other voter information. Because this data is provided at the county level during final formatting of the WORM disk by the headquarter computing unit, the third region is read/write accessible by the headquarter computing unit. The third disk region is also read only accessible by the precinct computing unit during an election. The fourth region is designated for receiving votes cast at the precinct level and therefore is read/write accessible by the precinct computing unit. The fourth region is read only accessible by the headquarter computing unit for tabulating votes. Optionally, further disk fields or regions are contemplated for storing voter signatures. For example, digitally encoded voter signatures can also be written to and read from the fourth region.

The WORM disk includes various fields or designated regions therein for recording voter identities to determine voter turnout in addition to the votes cast by the voters. As discussed previously, random means for recording the votes independent of the voter identity prevents any association of the voter with his or her vote. For further security, the fourth region is write protected when the election is over to prevent unauthorized additions of data. The WORM disk is contemplated as including sufficient disk storage space for receiving votes during both primaries and regular elections, wherein selected portions of the disk are write protected at the close of each election.

Figure 5A:
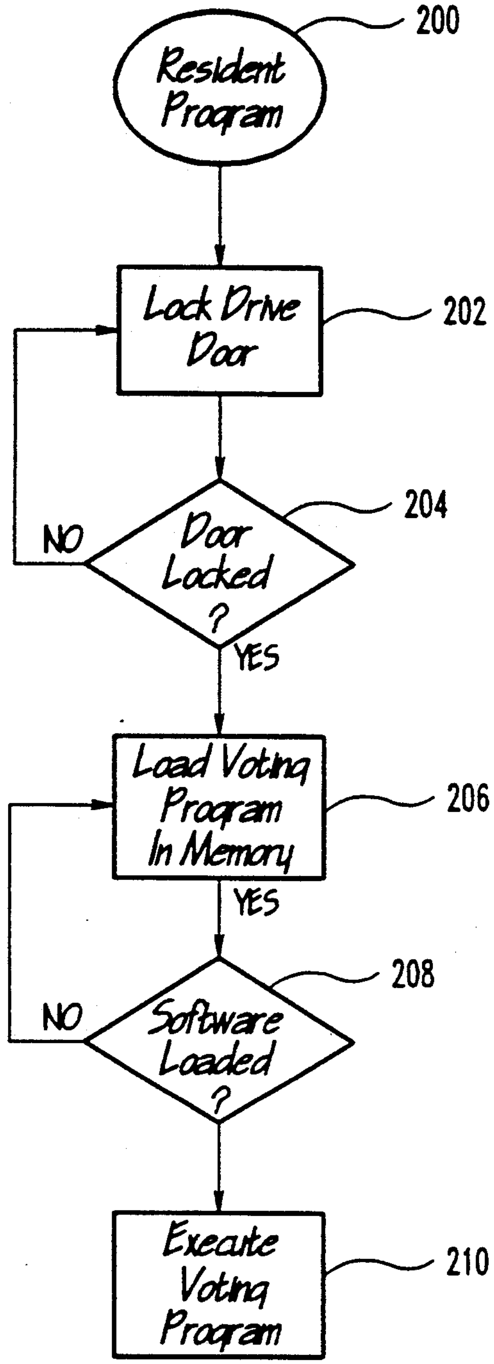
FIG. 5*a* is a flowchart of a software program executed by the precinct computing unit of FIG. 1.
Figure 5B:
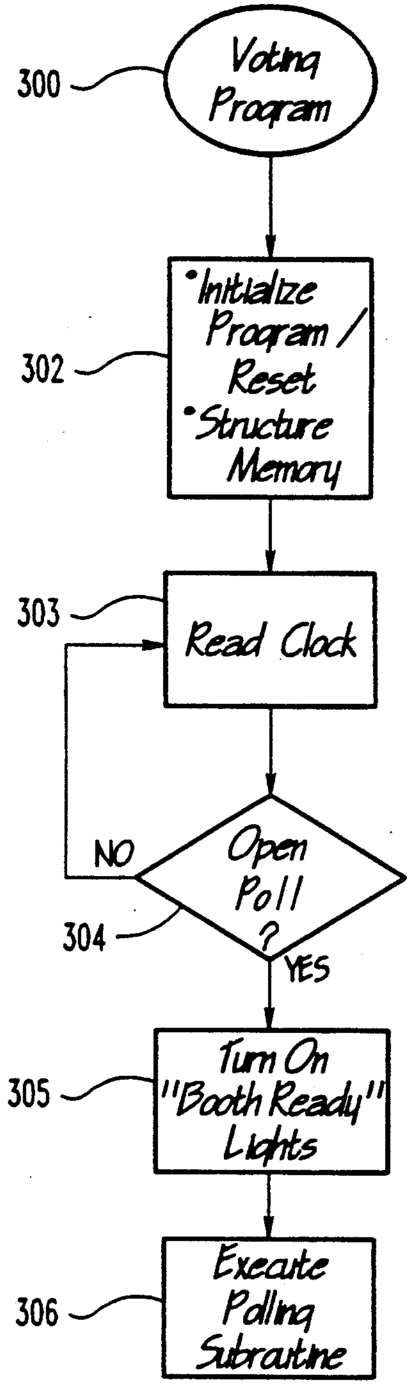
FIG. 5*b* is a flowchart of the voting subroutine of FIG. 5*a*.
Figure 5C:
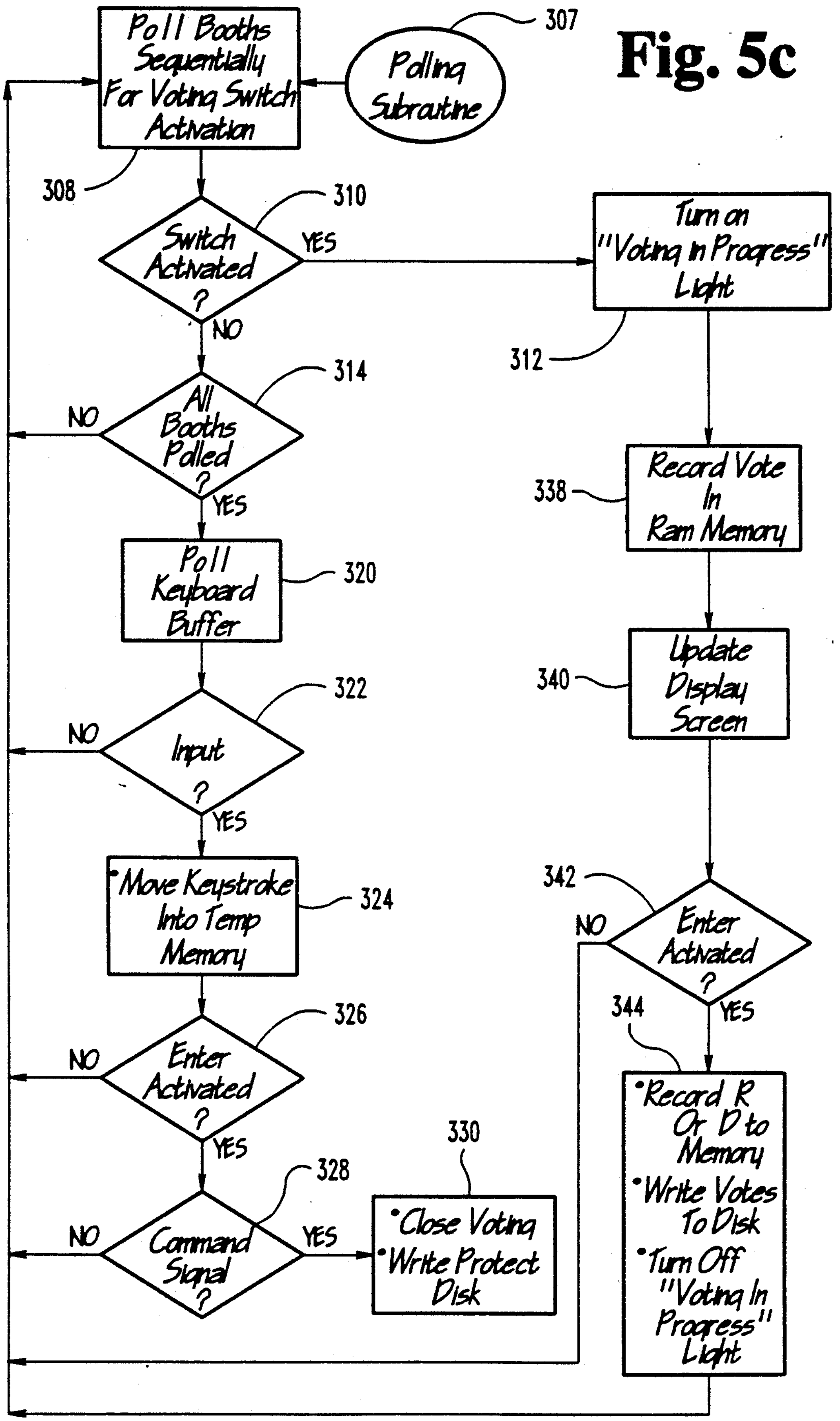
FIG. 5*c* is a flowchart of the polling subroutine of FIG. 5*b*.

One example of a typical election program governing the operation of the precinct computing unit is depicted in FIGS. 5*a* through 5*c*. Referring to FIG. 5*a*, each precinct computing unit includes initial programming 200 stored in either virtual or resident memory for controlling receipt of the WORM disk. Upon power-up, programming advances to step 202 to lock the WORM drive door. At step 204 programming loops on itself until confirming the WORM drive door is locked. Program execution continues at step 206, wherein the precinct computing unit reads the voting software contained on the WORM disk and loads it into memory. At step 208, programming loops on itself until the software is loaded. Program execution continues at step 210 to execute the voting program.

Referring now to FIG. 5*b*, program execution begins at step 300 and continues at step 302, wherein the program is initialized and the precinct computing unit's memory is structured. At step 303, the internal clock is read. At step 304, program execution loops on itself until the date and time read at step 303 matches the date and time recorded on the WORM disk for opening the polls. Program execution advances to step 305 and the "BOOTH READY" light is illuminated for each voting booth. At step 306, the polling subroutine is executed.

Referring now to FIG. 5*c*, program execution continues at step 307 to step 308, wherein the precinct computing unit reads the switches from one of the voting booths. Program execution advances to step 310 to determine whether a voting switch has been activated. If a switch has been activated, voting is in progress and program execution advances to step 312. If the voting switch has not been activated, indicating that the particular voting booth is vacant, program execution advances to step 314 to test whether all the voting booths have been polled. If not, program execution returns to step 308 to poll the next booth.

If all the booths have been polled, program execution advances to step 320 to poll the keyboard buffer. At step 322, if no keyboard entry has been made program execution returns to step 308 to continue polling the voting booths. If a keyboard entry has been detected at step 322, the keystroke is temporarily written to virtual or RAM memory of the precinct computing unit at step 324. Program execution advances to step 326 to test whether the keystroke has been entered. If the keystroke has not been entered, program execution returns to 308.

If the keystroke has been entered, program execution advances to step 328 to test whether the keystroke is a command signal. If so, program execution terminates at step 330, wherein the WORM disk is write-protected and voting is closed. If the keystroke is not a command signal, program execution returns to step 308.

For a given voting booth, wherein the voting switches are activated indicating voting is in progress, program execution advances through step 310 to step 312. At step 312, the "VOTING IN PROGRESS" light is illuminated and program execution advances to step 338. At step 338, the votes corresponding to the activated switches are temporarily stored in virtual or RAM memory until the votes are entered. Program execution advances to step 340 where the display is updated with further voting instructions and/or office and candidate choices (See FIGS. 6 through 15). At this step, the display is also interactive by allowing voter control via "NEXT" and "PREVIOUS" function keys 30. After the vote is recorded in RAM, program execution advances to step 342 to determine whether the voter has finished voting; i.e., whether "enter" is detected. If "enter" is not detected, voting is still in progress and program execution returns to step 308. If "enter" is detected, indicating the voter has finished voting, program execution advances to step 344 to permanently record the votes from virtual memory onto the WORM disk and deenergize the "VOTING IN PROGRESS" light. Program execution returns to step 308 to repeat the voting cycle.

Figure 6:
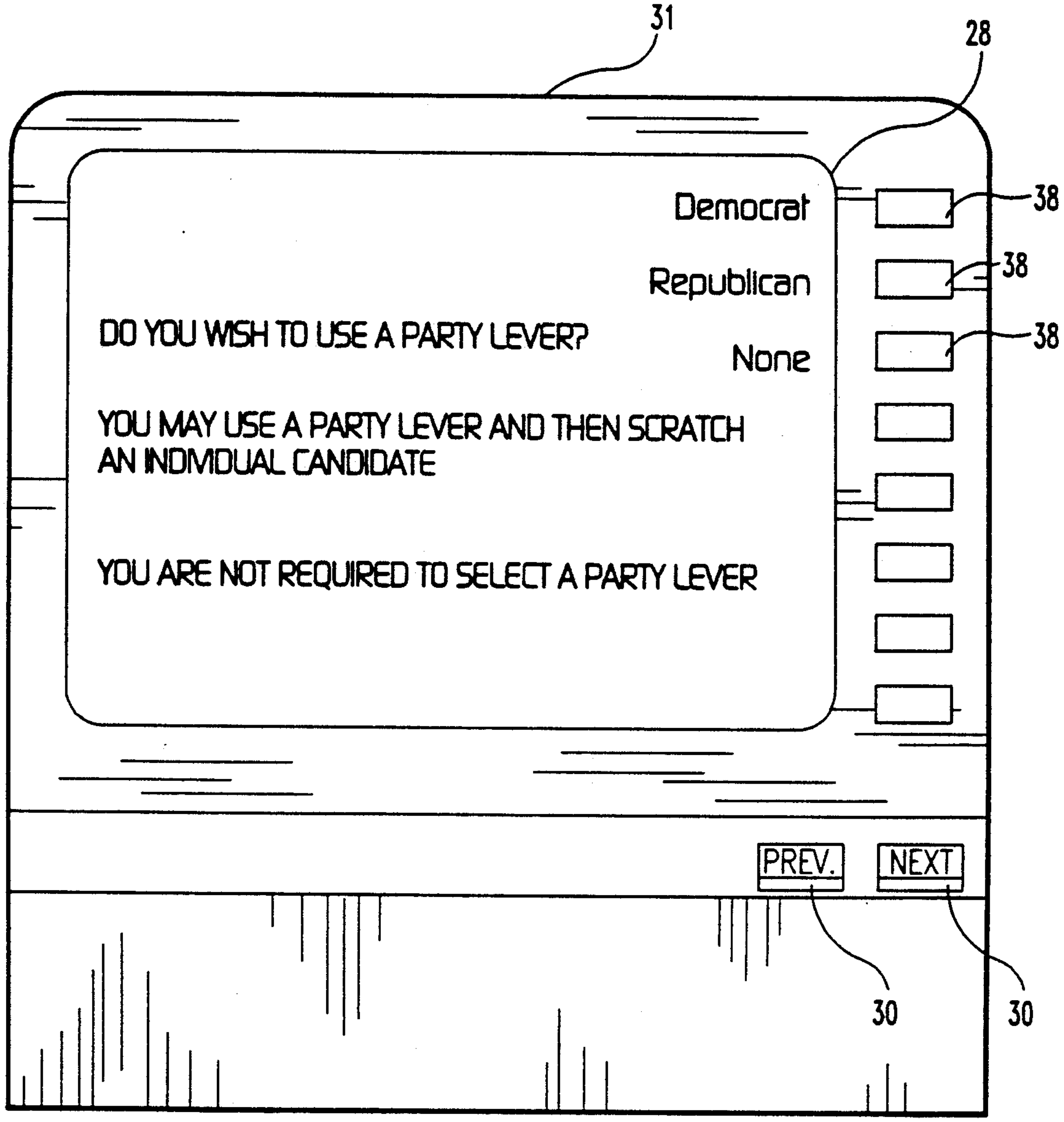
FIG. 6 is a front plan view of the display unit in FIG. 3 depicting an example of election data provided to a voter during voting.
Figure 7:
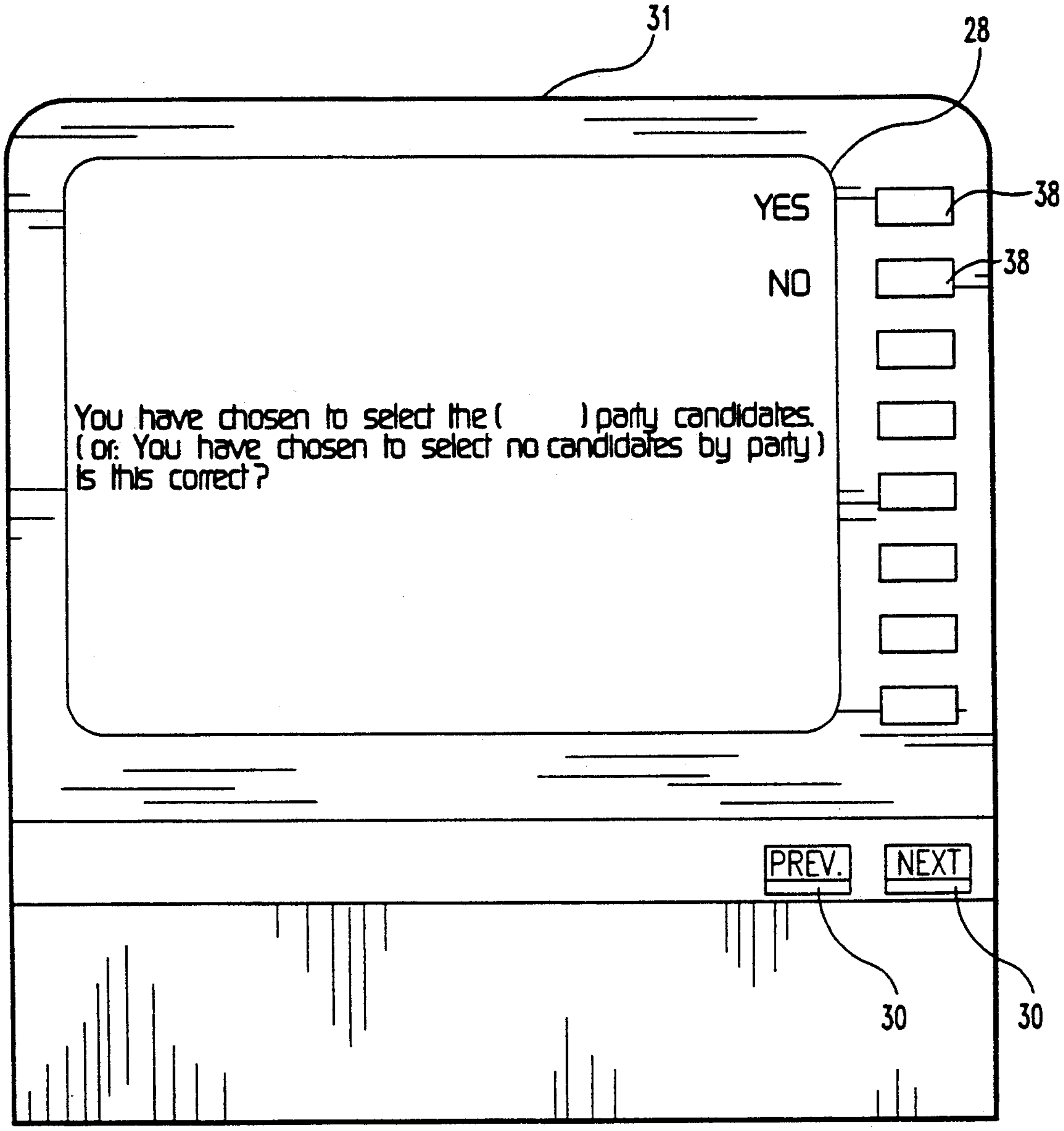
FIG. 7 is a front plan view of the display unit in FIG. 3 depicting another example of election data provided to a voter during voting.
Figure 8:
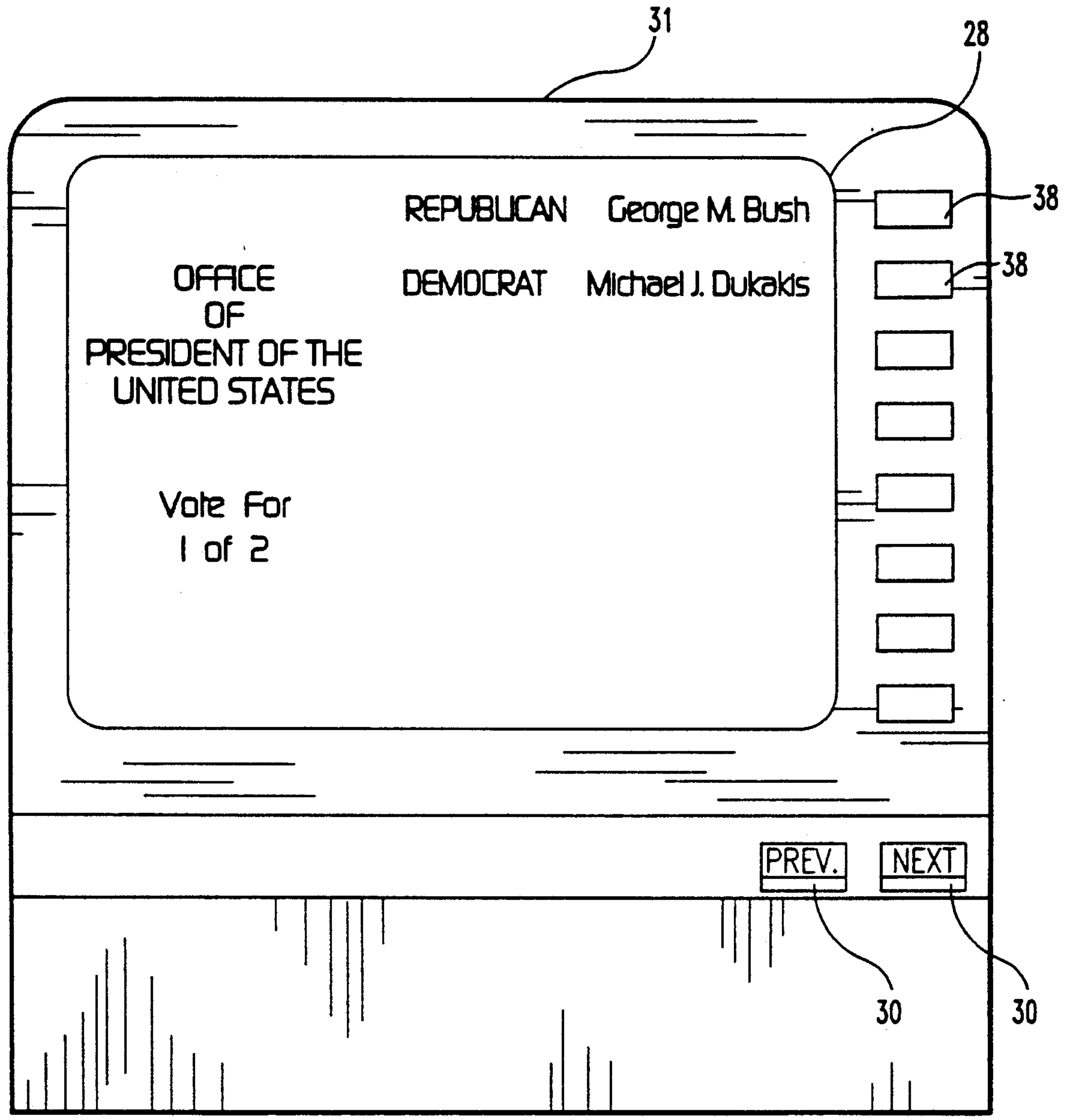
FIG. 8 is a front plan view of the display unit in FIG. 3 depicting another example of election data provided to a voter during voting.
Figure 9:
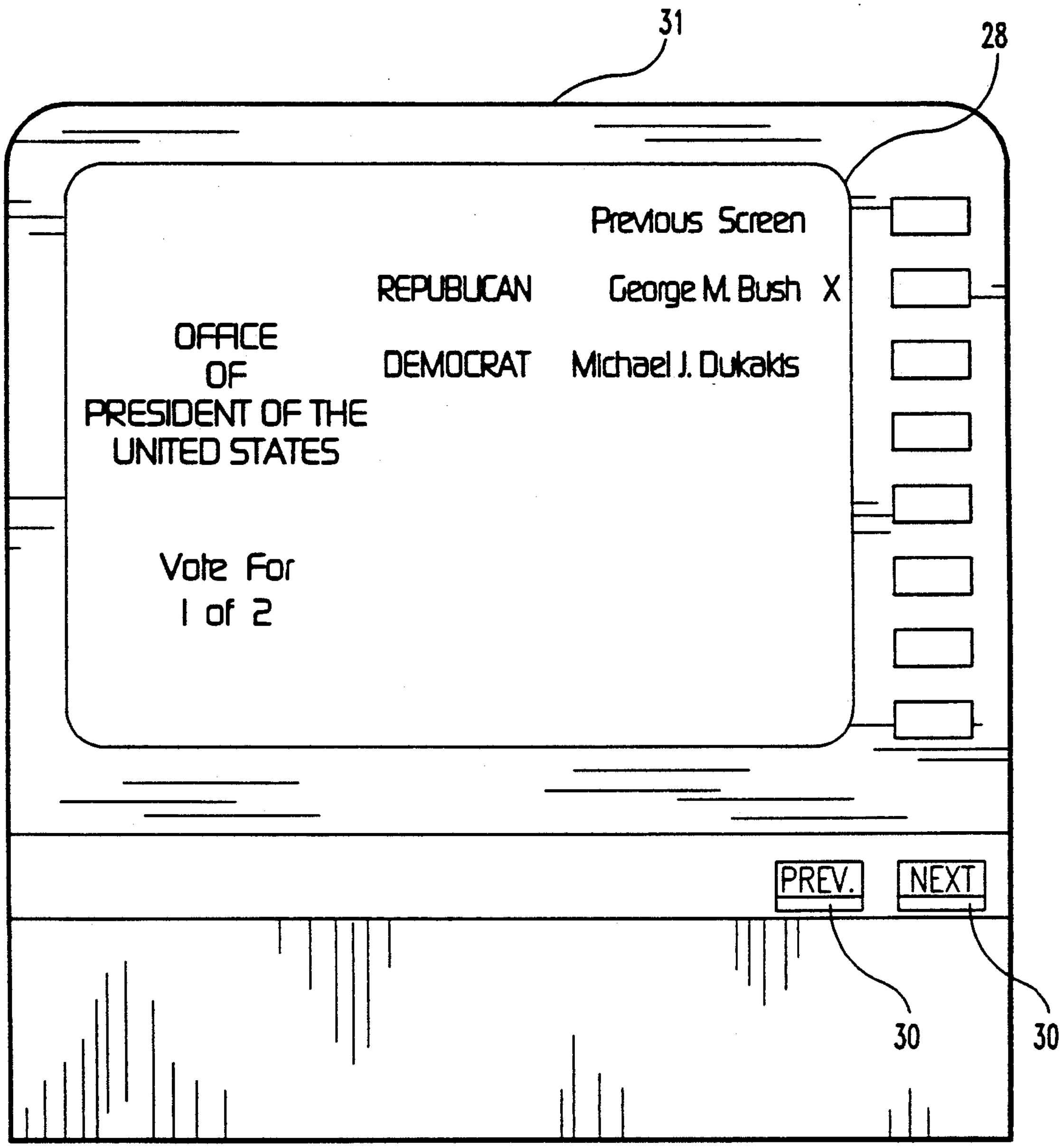
FIG. 9 is a front plan view of the display unit in FIG. 3 depicting another example of election data provided to a voter during voting.
Figure 10:
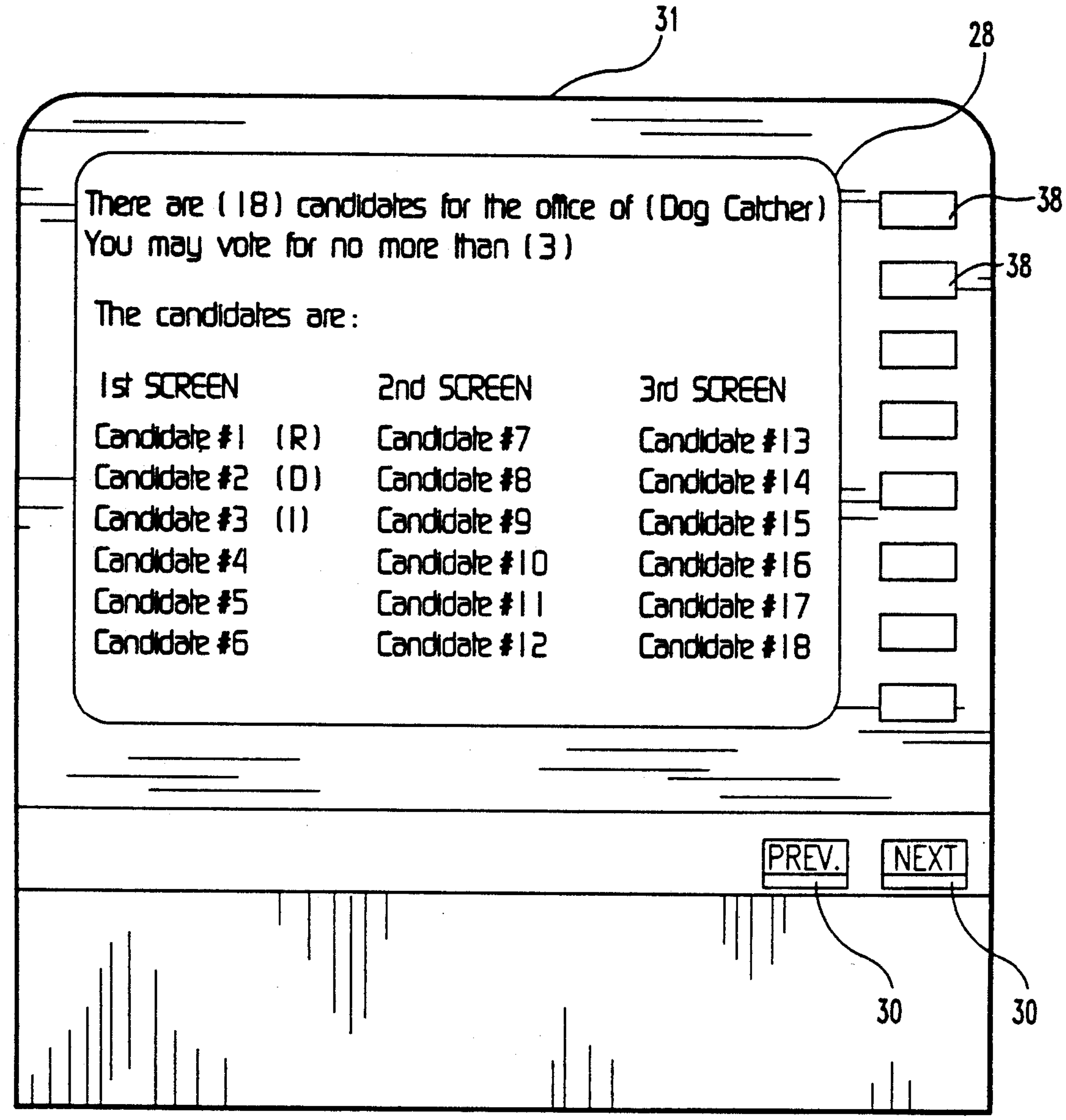
FIG. 10 is a front plan view of the display unit in FIG. 3 depicting another example of election data provided to a voter during voting.
Figure 11:
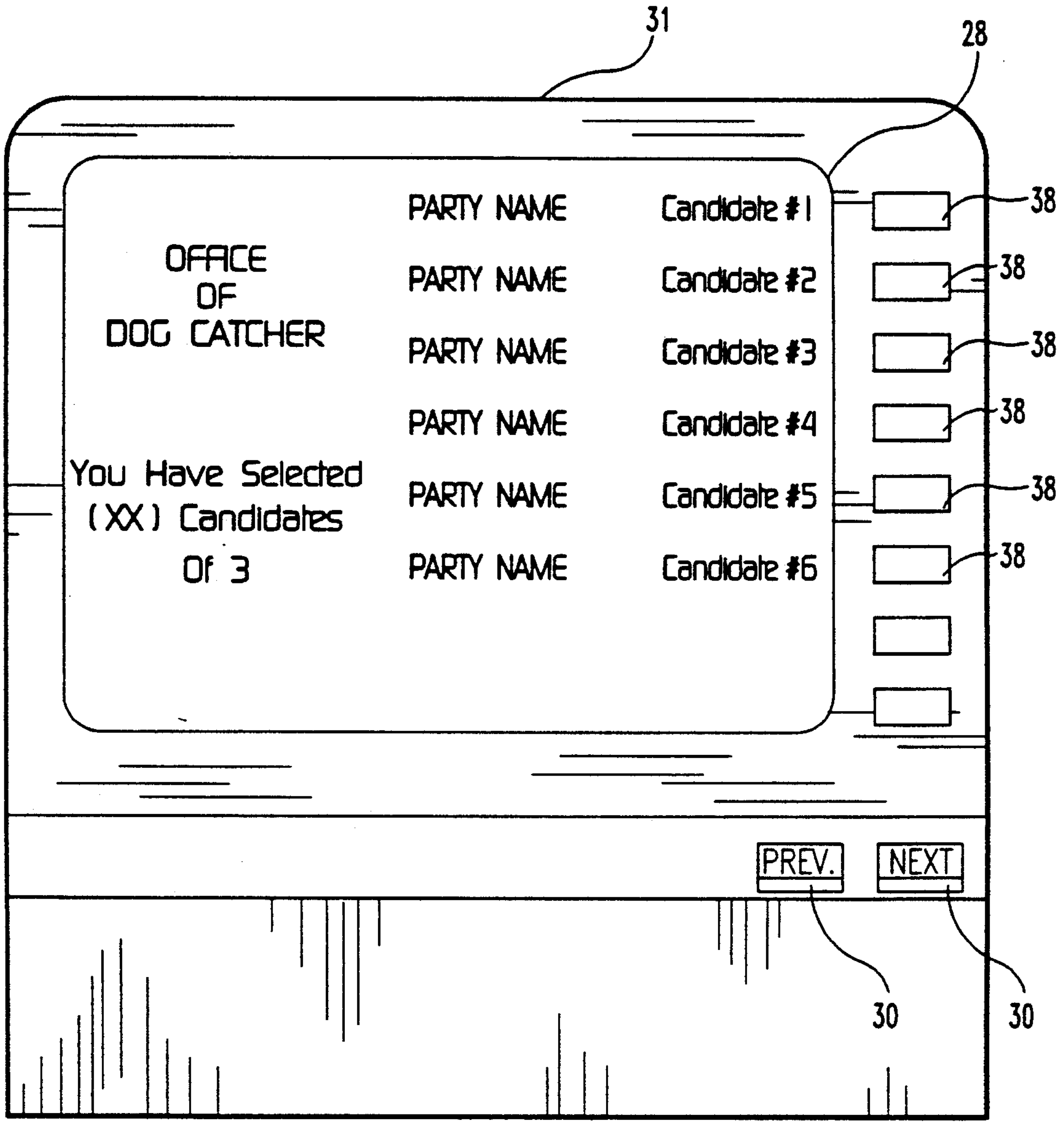
FIG. 11 is a front plan view of the display unit in FIG. 3 depicting another example of election data provided to a voter during voting.
Figure 12:
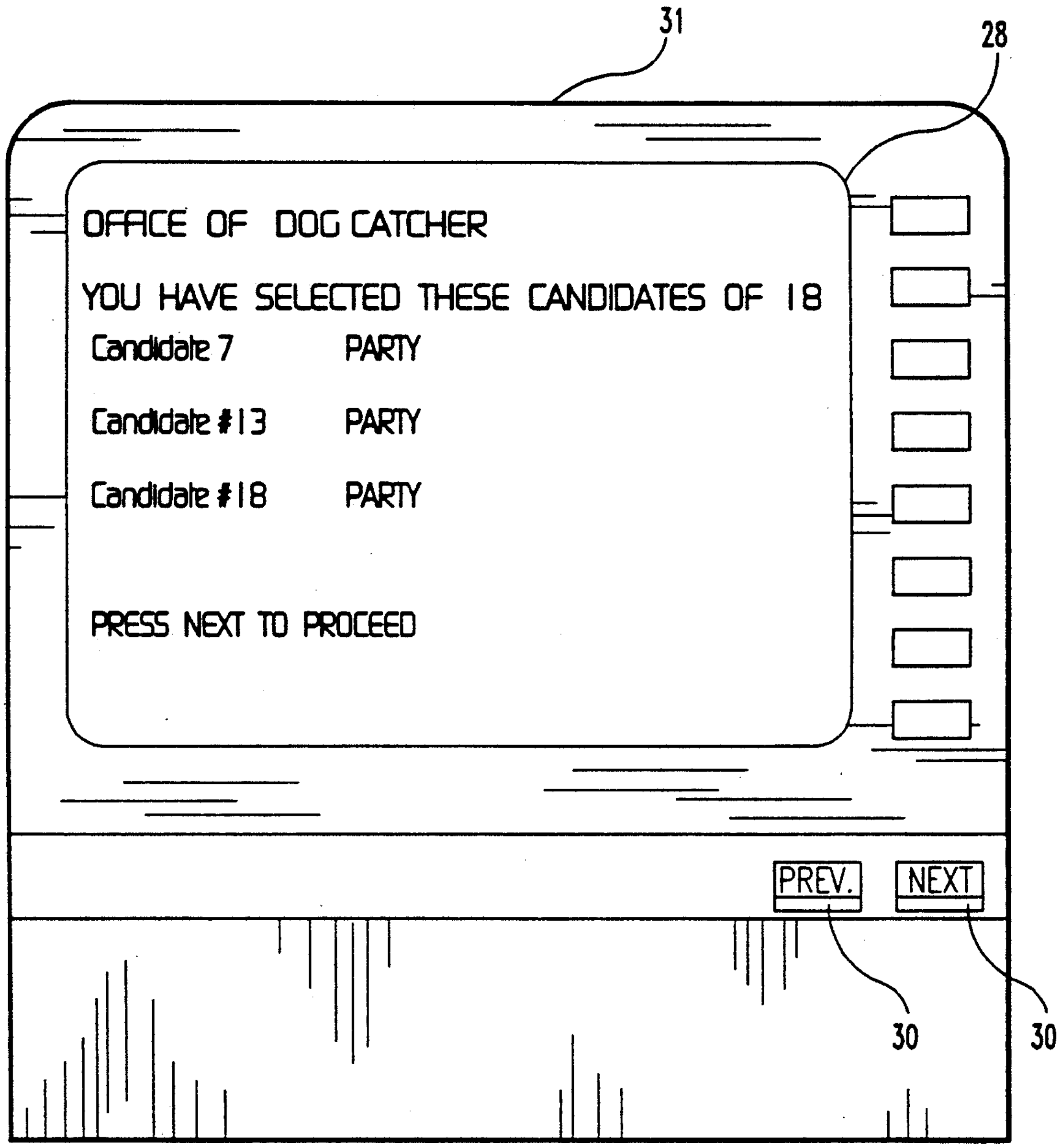
FIG. 12 is a front plan view of the display unit in FIG. 3 depicting another example of election data provided to a voter during voting.
Figure 13:
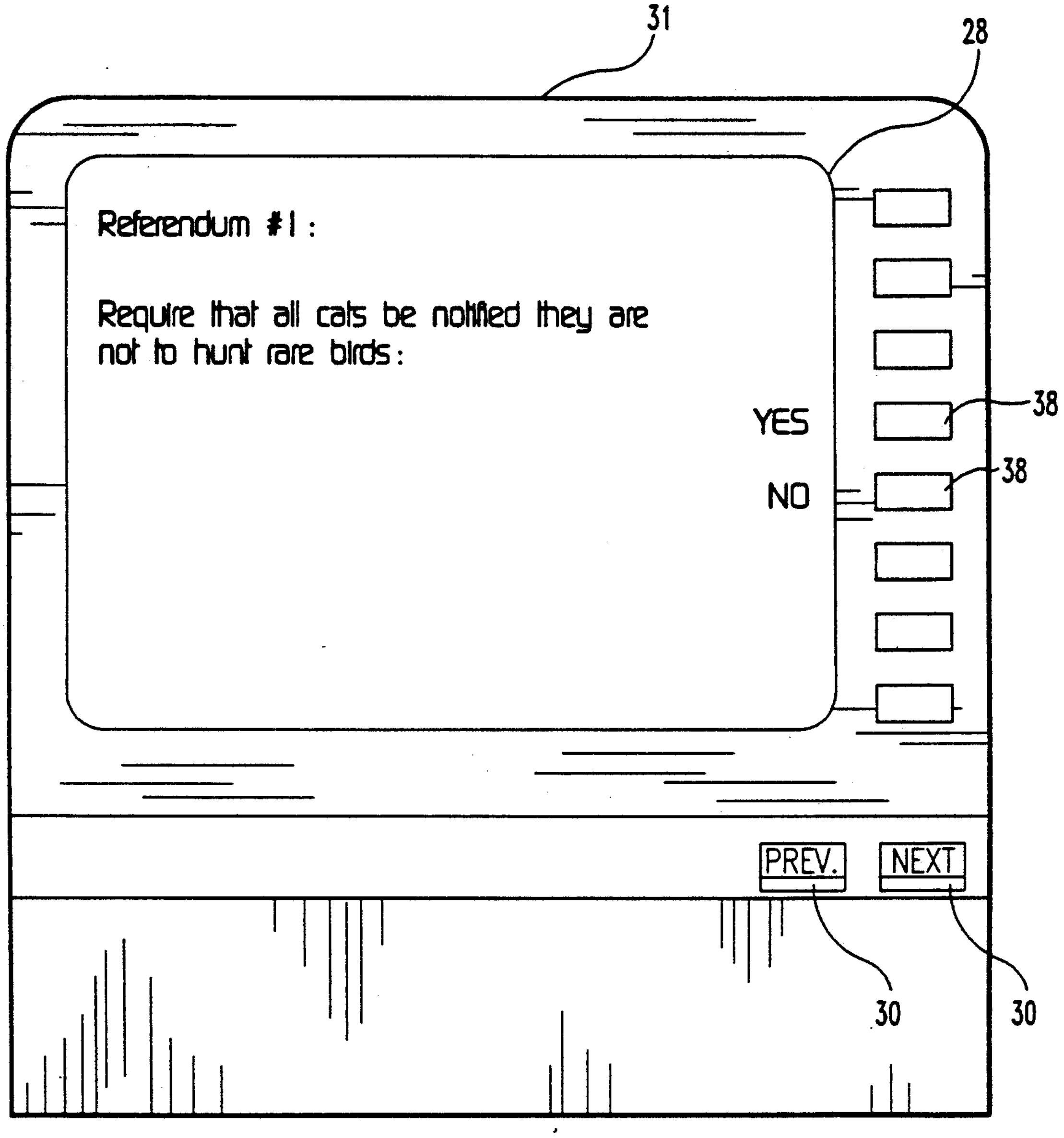
FIG. 13 is a front plan view of the display unit in FIG. 3 depicting another example of election data provided to a voter during voting.
Figure 14:
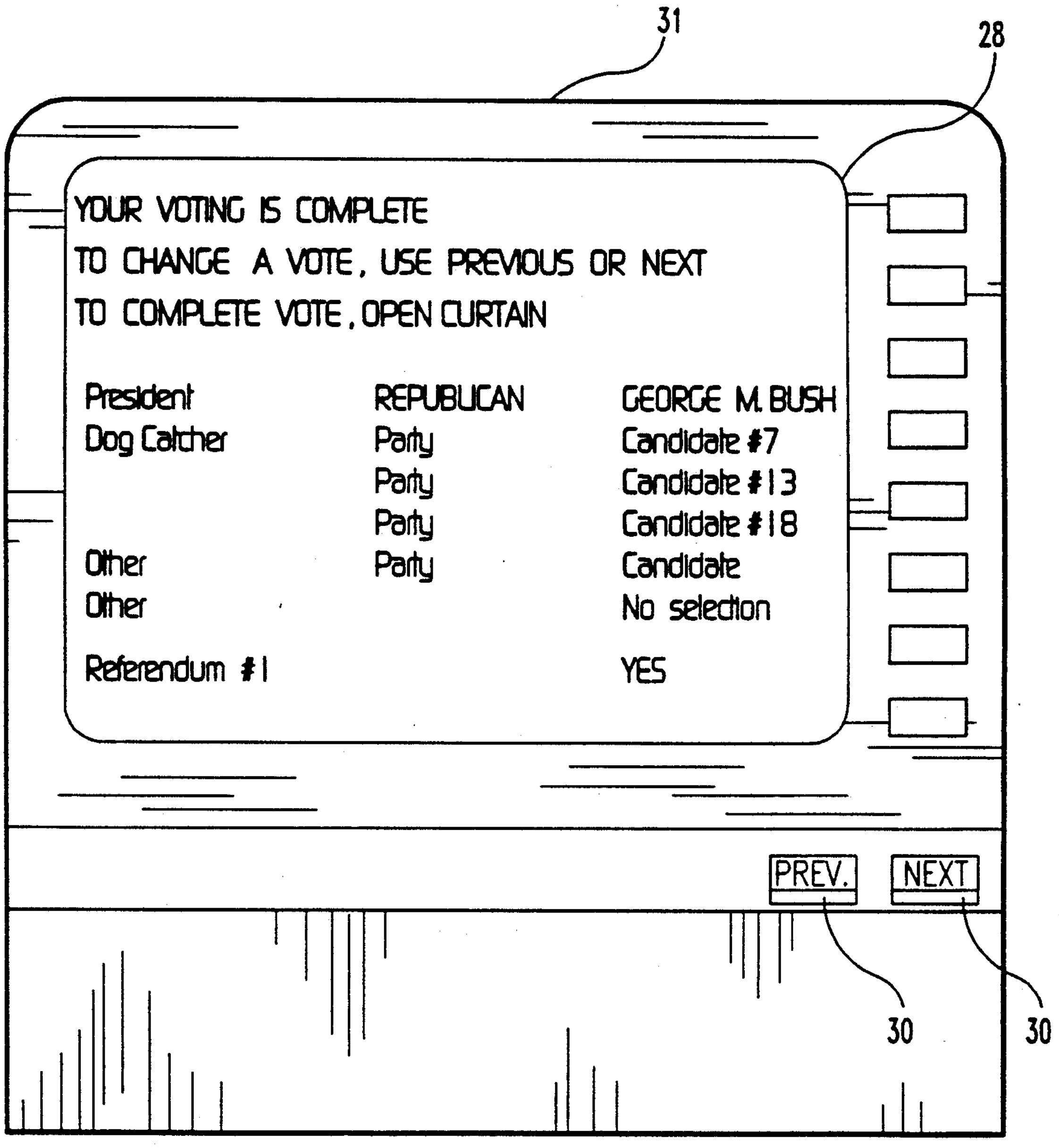
FIG. 14 is a front plan view of the display unit in FIG. 3 depicting another example of election data provided to a voter during voting.

Referring now to FIGS. 6 through 14, a set of possible voting displays according to the present invention are depicted for instructing voters during an election, with switches 38 adjacent and corresponding to the candidates choices shown on display 28. Upon entering the voting booth, the voter moves the lever to close the curtain, thereby starting voting. An initial display prompts the voter to begin voting as depicted in FIG. 6. As the voter activates the switches per the display, the display is updated as shown in FIG. 7. If a party was not selected per FIG. 6, the screen shown in FIG. 8 would be displayed prompting the voter to select a candidate. FIG. 9 depicts the display confirming either the candidate resulting from the party selection from FIG. 6 or the candidate selection from FIG. 8. Multiple screen slates are also contemplated as shown in FIG. 10 through 12. Referendums requiring voter input and the like are also envisioned as shown in FIG. 13. Finally, a summary is displayed at the end of voting and as depicted in FIG. 14, whereby the voter is instructed to change his vote prior to opening the curtain, as opening the curtain will cause the votes to be permanently recorded on the WORM disk.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An electronic voting system for use by voters to cast ballots therein during an election, comprising:

an electronic write once/read many storage medium adapted to store election data and ballots thereon;

a precinct computing unit corresponding to a geographical precinct in an election, said precinct computing unit having read/write means for reading said election data from said storage medium and for writing the cast ballots to said storage medium after each voter has finished casting said ballot;

output means, connected to said precinct computing unit, for transmitting the election data from said precinct computing unit to the voters;

input means, connected to said precinct computing unit, for receiving the ballots cast by the voters after each voter has finished casting said ballot;

a headquarter computing unit remote from said precinct computing unit and corresponding to a geographical county in an election, said headquarter computing unit having read/write means for receiving and accessing said write once/read many storage medium;

wherein said write once/read many storage medium is transportable between said precinct computing unit and said headquarter computing unit to communicate the election data and ballots therebetween.

2. The electronic voting system of claim 1 wherein the data written to said write once/read many storage medium is readable only by said precinct computing unit and said headquarter computing unit for preventing unauthorized access to data recorded thereon.

3. The electronic voting system of claim 2 wherein:

said write once/read many storage medium is an optical-disk cartridge and said precinct and headquarter computing unit read/write means are write once/read many optical disk drives.

4. The electronic voting system of claim 3 further comprising a plurality of voting booths electronically connected to each of said precinct computing units by said input means and said output means, wherein said voting booths provide a secure environment in which voters can secretly cast their ballots.

5. The electronic voting system of claim 4 wherein said optical disk comprises:

a first region having non-standard identification data stored therein to prevent unauthorized access to said disk;

a second region having election software therein for programming said precinct computing unit, said second region read only accessible by said precinct computing unit and inaccessible by said headquarter computing unit;

a third region adapted to receive election data such as electoral offices and candidate names therein from said headquarter computing unit, said third region read only accessible by said precinct computing unit and read/write accessible by said headquarter computing unit;

a fourth region adapted to receive ballots therein from said precinct computing unit, said fourth region read/write accessible by said precinct computing unit and read only accessible by said headquarter computing unit.

6. The electronic voting system of claim 5 wherein said precinct computing unit includes an internal clock.

7. The electronic voting system of claim 6 wherein said precinct computing unit includes means for recording voter identities and random means for writing the ballots to said optical disk, said random means randomly writing the ballots to said optical disk to preclude association of the voters with their ballots.

8. The electronic voting system of claim 7 including means for identifying (a) voters that voted during an election from a prerecorded list of available voters and (b) during a primary election, which political party the voter chose.

9. The electronic voting system of claim 8 and further comprising means for optically displaying the signatures of voters.

10. The electronic voting system of claim 9 wherein said precinct computing unit includes means for communicating with said headquarter computing unit during an election to allow interim polling of the precinct computing unit by the headquarter computing unit.

11. The electronic voting system of claim 10, wherein said precinct computing unit includes means for automatically enabling votes to be recorded only at a predetermined election date and time according to said internal clock.

12. An electronic voting system for use in an election and for storing election data and ballots to a write once/read many-type recording medium, comprising:

an optical write once/read many recording medium used to store election data and ballots thereon;

an electronic write once/read many apparatus capable of reading from an writing to said optical recording medium for recording the election data and ballots thereon;

wherein said electronic write once/read many apparatus is part of a precinct computing unit and is used for receiving and accessing said optical recording medium, said precinct computing unit reading the election data from said optical recording medium and writing data from completed ballot of a voter to said optical recording medium after each voter has finished voting.

13. The electronic voting system of claim 12 wherein the data written to said write once/read many storage medium is readable only by said precinct computing unit and said headquarter computing unit to prevent unauthorized access to data recorded thereon.

14. The electronic voting system of claim 12 wherein:

said optical recording medium is an optical-disk cartridge and said precinct computing unit read/write means is a write once/read many optical disk drive.

15. The electronic voting system of claim 14 wherein said optical-disk cartridge comprises:

a first region having non-standard identification data stored therein to prevent unauthorized access to said disk;

a second region having election software therein for programing the precinct computing unit, said second region read only accessible by said precinct computing unit;

a third region adapted to receive election data such as electoral offices and candidate names therein, said third region read only accessible by said precinct computing unit;

a fourth region adapted to receive ballots therein from said precinct computing unit, said fourth region read/write accessible by said precinct computing unit.

16. The electronic voting system of claim 15 wherein voters' signatures are digitally recorded on said fourth region of said optical-disk cartridge.

* * * * *